United States Patent
Yoon et al.

(10) Patent No.: US 12,007,949 B2
(45) Date of Patent: Jun. 11, 2024

(54) APPARATUS AND METHOD FOR DETECTING TARGET FILE BASED ON NETWORK PACKET ANALYSIS

(71) Applicant: KOOKMIN UNIVERSITY INDUSTRY ACADEMY COOPERATION FOUNDATION, Seoul (KR)

(72) Inventors: Myung Keun Yoon, Seoul (KR); Jun Nyung Hur, Seoul (KR); Hyeon Gy Shon, Seoul (KR)

(73) Assignee: KOOKMIN UNIVERSITY INDUSTRY ACADEMY COOPERATION FOUNDATION, Seoul (KR)

( * ) Notice: Subject to any disclaimer, the term of this patent is extended or adjusted under 35 U.S.C. 154(b) by 110 days.

(21) Appl. No.: 17/623,081

(22) PCT Filed: Jul. 22, 2021

(86) PCT No.: PCT/KR2021/009516
§ 371 (c)(1),
(2) Date: Dec. 27, 2021

(87) PCT Pub. No.: WO2022/097881
PCT Pub. Date: May 12, 2022

(65) Prior Publication Data
US 2022/0365909 A1 Nov. 17, 2022

(30) Foreign Application Priority Data
Nov. 5, 2020 (KR) .................. 10-2020-0146907

(51) Int. Cl.
*G06F 16/174* (2019.01)
*G06F 16/13* (2019.01)
(Continued)

(52) U.S. Cl.
CPC .......... *G06F 16/1752* (2019.01); *G06F 16/13* (2019.01); *G06F 16/148* (2019.01)

(58) Field of Classification Search
CPC .... G06F 16/1752; G06F 16/13; G06F 16/148; G06F 16/144; H04L 47/43; H04L 47/27; H04L 47/36; H04L 43/04
See application file for complete search history.

(56) References Cited

U.S. PATENT DOCUMENTS 6,363,429 B1 * 3/2002 Ketcham ............. H04L 65/1101
709/233
11,451,332 B2 * 9/2022 Coulombe ............ H04L 1/0057
(Continued)

FOREIGN PATENT DOCUMENTS

CN 103281213 A * 9/2013
KR 10-1465891 B1 11/2014
(Continued)

OTHER PUBLICATIONS

International Search Report for PCT/KR2021/009516 mailed Oct. 22, 2021 from Korean Intellectual Property Office.
(Continued)

*Primary Examiner* — Dennis Truong
(74) *Attorney, Agent, or Firm* — Paratus Law Group, PLLC (57) ABSTRACT

An apparatus for detecting a target file includes an inverse indexing database unit configured to generate at least one file chunk by performing a chunking operation on a target file, and inversely index each of the at least one file chunk as a target file code, a network packet receiving unit configured to receive a network packet, a packet chunk processing unit configured to generate at least one packet chunk by performing a chunking operation on a network packet, a chunk query unit configured to generate a packet chunk query word for each of the at least one packet chunk and
(Continued)

provide the packet chunk query word to the inverse indexing database unit to receive the detection target file code, and a file code determining unit configured to determine a most likely detection target file code in the network packet based on the received detection target file code.

15 Claims, 6 Drawing Sheets

(51) Int. Cl.
    *G06F 16/14*     (2019.01)
    *H04L 47/43*     (2022.01)

(56) References Cited

U.S. PATENT DOCUMENTS

| | | | |
|---|---|---|---|
| 2002/0152209 A1* | 10/2002 | Merugu | H04L 47/10 |
| 2007/0011734 A1* | 1/2007 | Balakrishnan | H04L 43/026 726/13 |
| 2009/0019246 A1* | 1/2009 | Murase | G06F 3/065 713/324 |
| 2010/0211843 A1* | 8/2010 | Dacosta | H04L 1/0014 714/E11.131 |
| 2011/0216774 A1* | 9/2011 | Nevil | H04L 12/56 370/395.7 |
| 2015/0007317 A1 | 1/2015 | Jain | |
| 2015/0095385 A1* | 4/2015 | Mensch | G06F 16/40 707/827 |
| 2021/0318934 A1* | 10/2021 | Heckel | G06F 3/0619 |
| 2021/0357363 A1* | 11/2021 | Mayo | G06F 16/182 |

FOREIGN PATENT DOCUMENTS

| | | | |
|---|---|---|---|
| KR | 101588976 B1 * | 1/2016 | |
| KR | 10-2019-0049244 A | 5/2019 | |
| KR | 20190049244 A * | 5/2019 | |
| KR | 10-2019-0112918 A | 10/2019 | |
| KR | 10-2020-0014979 A | 2/2020 | |
| KR | 20180099136 A * | 2/2020 | |

OTHER PUBLICATIONS

Yucheng Zhang et al., "AE: An Asymmetric Extremum Content Defined Chunking Algorithm for Fast and Bandwidth-Efficient Data Deduplication", 2015 IEEE Conference on Computer Communications (INFOCOM), 2015, pp. 1337-1345, IEEE.

* cited by examiner

APPARATUS AND METHOD FOR DETECTING TARGET FILE BASED ON NETWORK PACKET ANALYSIS

CROSS REFERENCE TO PRIOR APPLICATION

This application is a National Stage patent Application of PCT International Patent Application No. PCT/KR2021/009516 (filed on Jul. 22, 2021) under 35 U.S.C. § 371, which claims priority to Korean Patent Application No. 10-2020-0146907 (filed on Nov. 5, 2020), which are all hereby incorporated by reference in their entirety.

BACKGROUND

The present disclosure relates to a technique for detecting a similar file in visible network traffic, and more particularly, to an apparatus and method for detecting a target file based on network packet analysis by chunking network packets using a content-based chunking algorithm and searching an inverse index database (DB).\

For network security, it is necessary to capture network traffic and analyze the captured data to identify problems with network traffic or possible malicious activities. In particular, among methods for analyzing data transmitted through network traffic, a method for collecting specific information on a file at a packet level and detecting a similar file using the collected specific information may be used.

Conventionally, a file is extracted through Zeek (Bro), etc., and a similar file is detected by obtaining md5 or ssdeep from the extracted file and searching a DB.

However, this method has problems in that, if even one packet in a session is lost, it is not possible to properly extract the file, and even if every packet in a session is completely collected, it is not possible to extract the file of which a protocol or file type is not what zeek cannot parse. In addition, even if md5 of the extracted file is searched in the DB, md5 may not be found unless there is a completely identical file. In addition, in order to search for similarity based on ssdeep, there is time burden of comparing all the n number of files.

RELATED ART DOCUMENT

Patent Document

Korean Patent No. 10-1465891 (Nov. 20, 2014)

SUMMARY

The present disclosure provides an apparatus and method for detecting a target file based on network packet analysis by chunking network packets using a content-based chunking algorithm and searching an inverse index database (DB).

The present disclosure also provides an apparatus and method for detecting a target file based on network packet analysis, which is applied to raw packets, so that a preprocessing of parsing each packet into the header and the body is unnecessary and an inverse indexing method can be used to search for a similar file very quickly.

In an aspect, an apparatus for detecting a target file based on network packet analysis is provided. The apparatus includes an inverse indexing database unit configured to generate at least one file chunk by performing a chunking operation on a target file, and inversely index each of the at least one file chunk as a target file code, a network packet receiving unit configured to receive a network packet, a packet chunk processing unit configured to generate at least one packet chunk by performing a chunking operation on a network packet, a chunk query unit configured to generate a packet chunk query word for each of the at least one packet chunk and provide the packet chunk query word to the inverse indexing database unit to receive the detection target file code, and a file code determining unit configured to determine a most likely detection target file code in the network packet based on the received detection target file code.

The inverse indexing database unit may be further configured to perform asymmetric extremum chunking (AE chunking) on the detection target file.

The inverse indexing database unit may be further configured to chunk a character string based on an extremum detected in a local range of the detection target file and a specified window size.

The inverse indexing database unit may be further configured to, when a new extremum is not detected in the window size, generate a corresponding file chunk.

The inverse indexing database unit may be further configured to, when a new extremum is detected in the window size, defer the generating of the corresponding file chunk.

The inverse indexing database unit may be further configured to generate a chunk bitmap for each of the at least one file chunk and storing the chunk bitmap in association with the detection target file code.

The packet chunk processing unit may be further configured to, regardless of whether there is an error in the network packet, independently process a series of continuously received network packets.

The packet chunk processing unit may be further configured to, when an error in a specific network packet among the series of the network packets is equal to or greater than a predetermined criterion, assume a detection target file code of the specific network packet based on an adjacent detection target file code of an adjacent network packet.

The chunk query unit may be further configured to generate a packet chunk bitmap for each of the at least one packet chunk and receive the detection target file code based on the packet chunk bitmap.

The file code determining unit may be further configured to determine, as the most likely detection target file code, a detection object file code having a highest frequency of occurrence among detection object file codes of each of the at least one packet chunk.

The file code determining unit may be further configured to, when the detection target file code having the highest frequency of occurrence constitutes a majority, determine the most likely detection target file code.

The file code determining unit may be further configured to, when the detection target file code having the highest frequency of occurrence does not constitute a majority, determining the most likely detection target file code by considering an adjacent a nearby network packet together.

In another aspect, a method for detecting a target file based on network packet analysis is provided. The method includes generating at least one file chunk by performing a chunking operation on a detection target file, and inversely indexing each of the at least one file chunk as a detection target file code, receiving a network packet, generating at least one packet chunk by performing a chunking operation on the network packet, generating a packet chunk query word for each of the at least one packet chunk and providing the packet chunk query word to the inverse indexing database unit to receive the detection target file code, and determining a most likely detection target file code in the network packet based on the received detection target file code.

The inversely indexing may include generating a chunk bitmap for each of the at least one file chunk and storing the chunk bitmap in association with the detection target file code.

The receiving of the detection target file code may include generating a packet chunk bitmap for each of the at least one packet chunk and receiving the detection target file code based on the packet chunk bitmap.

The present disclosure may have the following effects. However, it does not mean that a particular exemplary embodiment includes all of, or only, the following effects. Therefore, it should not be understood that the scope of right of the present disclosure is not limited to the following.

The apparatus and method for detecting a target file based on network packet analysis according to an embodiment of the present disclosure may chunk a network packet using a content-based chunking algorithm and search for the network packet in an inverse indexing database (DB).

The apparatus and method for detecting a target file based on network packet analysis according to an embodiment of the present disclosure is applicable to a raw packet, so that a pre-processing of parsing into a header and a body is not necessary and an inverse indexing method can be used to search for a similar file very quickly.

DETAILED DESCRIPTION

Description of the present disclosure is made to exemplary embodiments for structural or functional features, and the scope of rights to the present disclosure will not be construed as being limited to the exemplary embodiments described herein. That is, the exemplary embodiments may be amended in various ways and have various forms. Accordingly, the scope of the present disclosure will be understood as including equivalents which embody the technical spirit. Furthermore, an objective or effect proposed in the present disclosure does not mean that a specific embodiment should include all of objectives or effects or should include a corresponding effect, and thus the scope of the present disclosure should not be understood to be restricted thereby.

Meanwhile, terms used herein will have the following meanings.

Terms "first", "second", etc. are used to distinguish an element from other elements, and the scope of the present disclosure will not be limited by these terms. For example, a first element may be named as a second element, and similarly, the second element may be named as the first element.

It will be understood that when an element is referred to as being "connected" to another element, it can be directly connected or coupled to the other element or an intervening element may be present therebetween. In contrast, when an element is referred to as being "directly connected" to another element, it should be understood that there is no intervening element. Other words used to describe relationships between elements, such as "between", "directly between", "adjacent", and "directly adjacent", should be interpreted in a like fashion.

An expression of the singular number should be understood to include plural expressions, unless clearly expressed otherwise in the context. It will be further understood that terms such as "comprises" and "have" specify the presence of stated features, items, steps, operations, elements, and/or components, but do not preclude the presence or addition of one or more other features, items, steps, operations, elements, components, and/or groups thereof.

In each of steps, symbols (e.g., a, b, and c) are used for convenience of a description, and the symbols do not describe order of the steps. The steps may be performed in order different from order described in the context unless specific order is clearly described in the context. That is, the steps may be performed according to described order, may be performed substantially at the same time, or may be performed in reverse order.

The present disclosure may be implemented in a computer-readable recording medium in the form of computer-readable code. The computer-readable recording medium includes all types of recording devices in which data readable by a computer system is stored. The computer-readable recording medium may include ROM, RAM, CD-ROM, magnetic tapes, floppy disks, and optical data storages, for example. Furthermore, the computer-readable recording medium may be distributed to computer systems connected over a network, and the computer-readable code may be stored and executed in the computer systems in a distributed manner.

Unless otherwise defined, all terms used herein and including technical and scientific terms have the same meaning as those generally understood by those skilled in the art. Terms defined in commonly used dictionaries should be interpreted as having the same meanings as those in the context of related technologies, and unless clearly defined, are not interpreted as ideally or excessively formal meanings.

Figure 1:
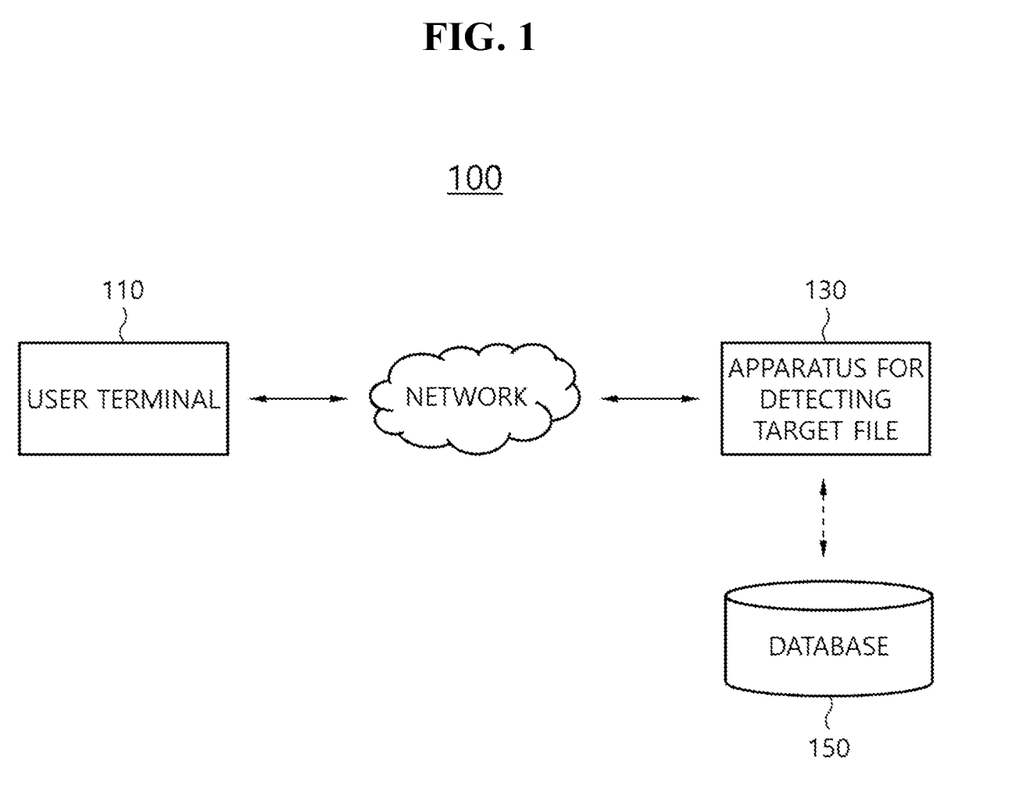
FIG. 1 is a diagram illustrating a system for detecting a target file according to an embodiment of the present disclosure.

FIG. 1 is a diagram illustrating a system for detecting a target file according to an embodiment of the present disclosure.

Referring to FIG. 1, a system 100 for detecting a target file may include a user terminal 110, an apparatus 130 for detecting a target file, and a database 150.

The user terminal 110 may correspond to a computing device capable of performing data communication to process a file using a network. The user terminal 110 may be implemented as a smartphone, a laptop, or a computer. The user terminal 110 may be implemented as any of various devices such as a tablet PC, but not limited thereto. The user terminal 110 may be connected to the apparatus 130 through a network and a plurality of user terminals 110 may be simultaneously connected to the apparatus 130.

The apparatus 130 may be connected to the user terminal 110 through a network and may be implemented as a server, which corresponds to a computer or program capable of detecting a preset similar file through analysis on network packets to be transmitted during a data transmission process as a target file. The apparatus 130 may be connected to the user terminal 110 through the network and exchange information therewith. In one embodiment, the apparatus 130 may store data required to monitor the network in conjunction with the database 150.

The database 150 may correspond to a storage device that stores a variety of information required for operation of the apparatus 130. The database 150 may store an inverse index database (DB) for file detection and may store information on a network packet associated with a particular user terminal 110. However, aspects of the present disclosure are not necessarily limited thereto, and the database 150 may store information that are collected or processed in a variety of forms during a process in which the apparatus 130 detects a file similar to a target file through network packet analysis.

Figure 2:
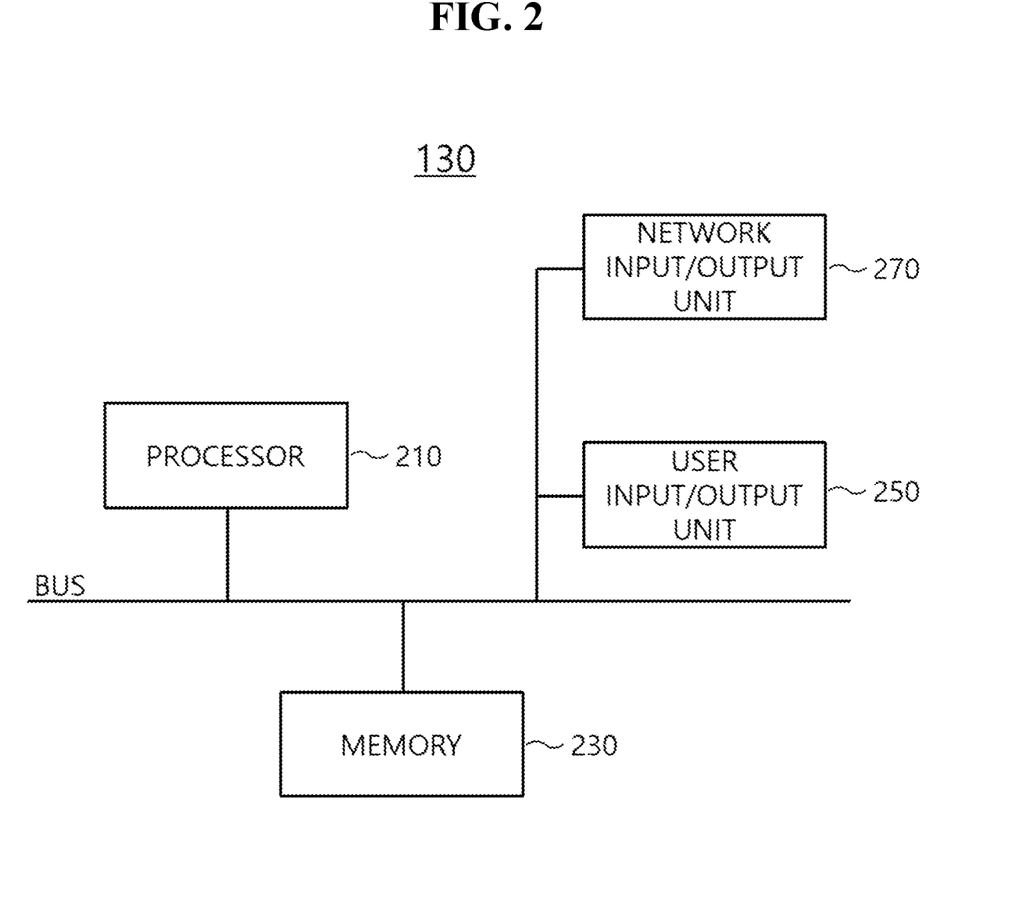
FIG. 2 is a diagram illustrating a system configuration of an apparatus for detecting a target file of FIG. 1.

FIG. 2 is a diagram illustrating a system configuration of an apparatus for detecting a target file of FIG. 1.

Referring to FIG. 2, the apparatus 130 for detecting a target file may include a processor 210, a memory 230, a user input/output unit 250, and a network input/output unit.

The processor 210 may execute a procedure that processes steps in a process in which the apparatus 130 operates. The processor 210 may manage the memory 230 that is read or written in the overall process and may schedule synchronization time between a volatile memory and a non-volatile memory in the memory 230. The processor 210 may control the overall operation of the apparatus 130 and may be electrically connected to the memory 230, the user input/output unit 250, and the network input/output unit 270 to control a dataflow therebetween. The processor 210 may be implemented as a Central Processing Unit (CPU) of the apparatus 130.

The memory 230 may include an auxiliary memory device implemented as a non-volatile memory such as a Solid State Drive (SSD) or a Hard Disk Drive (HDD) to store overall data, and may include a main memory device implemented as a volatile memory such as a Random Access Memory (RAM) to store overall data necessary for the apparatus 130.

The user input/output unit 250 may include an environment for receiving a user input and an environment for outputting predetermined information for a user. For example, the user input/output unit 250 may include an input device including an adapter, such as a touch pad, a touch screen, a screen keyboard, and a pointing device, or may include an output device including an adapter, such as a monitor and a touch screen. In one embodiment, the user input/output unit 250 may correspond to a computing device to be accessed through remote access. In this case, the apparatus 130 may serve as an independent server.

The network input/output unit 270 may include an environment for connecting to an external device or a system through a network. For example, the network input/output unit 270 may include an adapter for communication of a Local Area Network (LAN), a Metropolitan Area Network (MAN), a Wide Area Network (WAN), and a Value Added Network (VAN).

Figure 3:
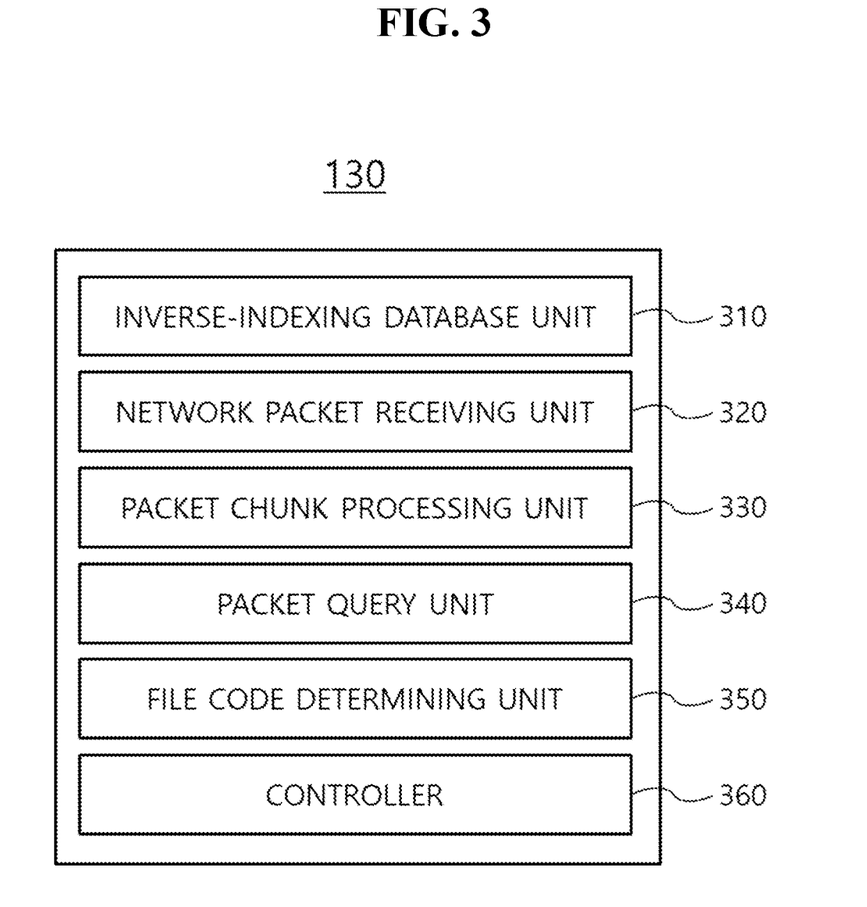
FIG. 3 is a diagram illustrating a functional configuration of the target file detecting apparatus of FIG. 1.

FIG. 3 is a diagram illustrating a functional configuration of the apparatus for detecting a target file, shown in FIG. 1.

Referring to FIG. 3, the apparatus 130 for detecting a target file may include an inverse indexing database unit 310, a network packet receiving unit 320, a packet chunk processing unit 330, a chunk query unit 340, a file code determining unit 350, and a controller 360.

The inverse indexing database unit 310 may generate at least one file chunk by performing a chunking operation on a detection target file, and inversely index each of the at least one file chunk as a detection target file code. In this case, the chunking operation may correspond to an operation of dividing one data such as a file or a packet into chunks corresponding to data items which are sub units, and a file chunk may correspond to a chunk obtained through a chunking operation performed on a file. In addition, the detection target file code may correspond to identification information for independently identifying a preset detection target file.

That is, the inverse indexing database unit 310 may construct a database by performing in advance a chunking operation on a detection target file. In particular, the inverse indexing database unit 310 may inversely index chunks extracted from files, so that index information on the files including the corresponding chunks can be stored into a database.

In one embodiment, the inverse indexing database unit 310 may perform asymmetric extremum (AE) chunking on a detection target file. Various algorithms may be utilized for a chunking operation to generate a file chunk. In particular, the inverse indexing database unit 310 may perform a chunking operation using a dynamic chunking algorithm. The dynamic chunking algorithm will be described in more detail with reference to FIG. 5.

In one embodiment, the inverse indexing database unit 310 may chunk a character string based on an extremum detected in the local range of the detection target file and a specified window size and. In the AE chunking, it is possible to chunk a character string based on the extremum found within the region of the file i.e. in a local range, and the specified window size. More specifically, when a new extremum is not detected in the window size, the inverse indexing database unit 310 may generate a corresponding file chunk, and when a new extremum is detected in the window size, the inverse indexing database unit 310 may defer generating the corresponding file chunk.

That is, the AE chunking may correspond to content-defined-chunking (CDC) because a chunking operation is performed based on an extremum. In addition, the AE chunking may correspond to a relatively light chunking algorithm because it does not perform a back-tracing operation and only remembers the extremum and its location. In addition, the AE chunking may provide excellent performance in deduplication in that chunks of the same type are highly likely to be generated in duplicated sections.

In one embodiment, the inverse indexing database unit 310 may generate a chunk bitmap for each of at least one file chunk and store the chunk bitmap in association with a detection target file code. That is, the inverse indexing database unit 310 may generate a chunk bitmap as identification information for identifying a file chunk and may connect the detection target file code to the chunk bitmap, so that the detection target file code can be stored into a database. A chunk bitmap is unique identification information corresponding to each file chunk and may be used to form a bitmap index. That is, the inverse indexing database unit 310 may generate a chunk bitmap corresponding to each file chunk and may be connected to a detection target file code through a bitmap index composed of chunk bitmaps.

The network packet receiving unit 320 may receive a network packet. The network packet receiving unit 320 may operate in conjunction with a communication module for network communication, and may acquire a network packet transmitted or received in a network communication process as related information. The network packet receiving unit 320 may operate to transmit the received network packet to the packet chunk processing unit 330 so that a next operation can be performed. The network packet receiving unit 320 may receive the network packet and store the received network packet in the database 150. If necessary, the network packet receiving unit 320 may sequentially insert network packets into a pre-generated data queue for interworking with a next operation.

The packet chunk processing unit 330 may generate at least one packet chunk by performing a chunking operation on the network packet. The packet chunk processing unit 330 may perform a chunking operation corresponding to the chunking operation performed by the inverse indexing database unit 310, and may generate a packet chunk as a result of the chunking operation on the network packet.

In one embodiment, regardless of whether there is an error in the network packet, the packet chunk processing unit 330 may independently process a series of continuously received network packets. More specifically, the network packet receiving unit 320 may receive and sequentially store network packets transmitted from an outside, and the packet chunk processing unit 330 may sequentially process the network packets according to an order in which the network packets are received. The packet chunk processing unit 330 may independently perform a chunking operation on each of the network packets and may independently store packet chunks generated for each of the network packets.

In one embodiment, when an error in a specific network packet among the series of the network packets is equal to or greater than a predetermined specific criterion, the packet chunk processing unit 330 may assume a detection target file code of the specific network packet based on an adjacent detection target file code of an adjacent network packet. The packet chunk processing unit 330 may perform an error check on each network packet. When the result of the error check shows an error in a network packet exceeds the predetermined specific criterion, the packet chunk processing unit 30 may omit the chunking operation on the corresponding network packet. That is, for a network packet in an error exceeding the criterion has been detected, the packet chunk processing unit 330 may not perform a chunking operation on the corresponding network packet and may instead determine a most similar network packet among previous network packets and use the most similar network packet as a detection target file code connected to the corresponding network packet.

The chunk query unit 340 may generate a packet chunk query word for each of at least one packet chunk and provide the packet chunk query word to the inverse indexing database unit 310 to receive a detection target file code. That is, the chunk query unit 340 may obtain information on the detection target file associated with each packet chunk using a previously constructed inverse index database (DB). To this end, the chunk query unit 340 may provide the inverse indexing database unit 310 with a packet chunk query word for search, and the inverse indexing database unit 310 may provide information on a detection target file code corresponding to the corresponding packet chunk in response to the packet chunk query word.

In one embodiment, the chunk query unit 340 may generate a packet chunk bitmap for each of at least one packet chunk and receive a detection target file code based on the packet chunk bitmap. That is, when the inverse index database (DB) is composed of bitmap indices based on chunk bitmaps, the chunk query unit 340 may generate a chunk bitmap for a query on a packet chunk and provide the generated chunk bitmap to the inverse indexing database unit 310, and the inverse indexing database unit 310 may perform a search operation based on the corresponding chunk bitmap and provide a detection target file code as a query response corresponding to the corresponding packet chunk.

The file code determining unit 350 may determine a most likely detection target file code in the network packet based on the detection target file code received by the chunk query unit 340. That is, the file code determining unit 350 may effectively detect a file most similar to a data packet transmitted through the network using the inverse index database (DB). To this end, the chunk query unit 340 may determine a similar file corresponding to each data packet by integrating information on detection target file codes collected for packet chunks obtained through a chunking operation.

In one embodiment, the file code determining unit 350 may determine a detection target file code having a highest frequency of occurrence among respective detection target file codes of at least one packet chunk as a most likely detection target file code. That is, the file code determining unit 350 may determine a detection target file code having a highest frequency of occurrence as a result of integrating detection target file codes corresponding to each packet chunk for a specific data packet, and determine the corresponding detection target file code as a similar file corresponding to the specific data packet.

In one embodiment, the file code determining unit 350 may determine a most likely detection target file code when the most frequent detection target file codes constitute a majority. In another embodiment, the file code determining unit 350 may determine a hit score for each detection target file code, and determine a final detection target file code based on a ratio of hit scores to the total number of packet chunks. That is, the file code determining unit 350 may calculate a similarity of each detection target file code by integrating the frequencies of occurrence of the detection target file codes respectively collected for packet chunks, and detect a final similar file by determining a detection target file code having a highest similarity.

In one embodiment, when the detection target file code having the highest frequency of occurrence does not constitute a majority, the file code determining unit 350 may determine a most likely detection target file code by considering adjacent network packets together. In a case where the detection target file codes having the highest frequency of occurrence does not constitute a majority, it means that file information on a corresponding network packet is not clear, and thus, a similar file may be detected by integrating file information on an adjacent network packet. In this case, the adjacent network packet may be defined as a set of network packets prior to the current network packet.

In another embodiment, the file code determining unit 350 may dynamically determine the number of adjacent network packets based on a frequency of occurrence of a detection target file code that has a highest frequency of occurrence. For example, when the frequency of occurrence of the detection target file code which has the highest frequency of occurrence is less than 10%, 20%, or 50% of the total number of packet chunks, the file code determining unit 350 may determine the number of adjacent network packets as 5, 4, or 1.

The controller 360 may control the overall operation of the apparatus 130 for detecting a target file and may control the control flow or data flow of the inverse indexing database unit 310, the network packet receiving unit 320, the packet chunk processing unit 330, the chunk query unit 340, and the file code determining unit 350.

Figure 4:
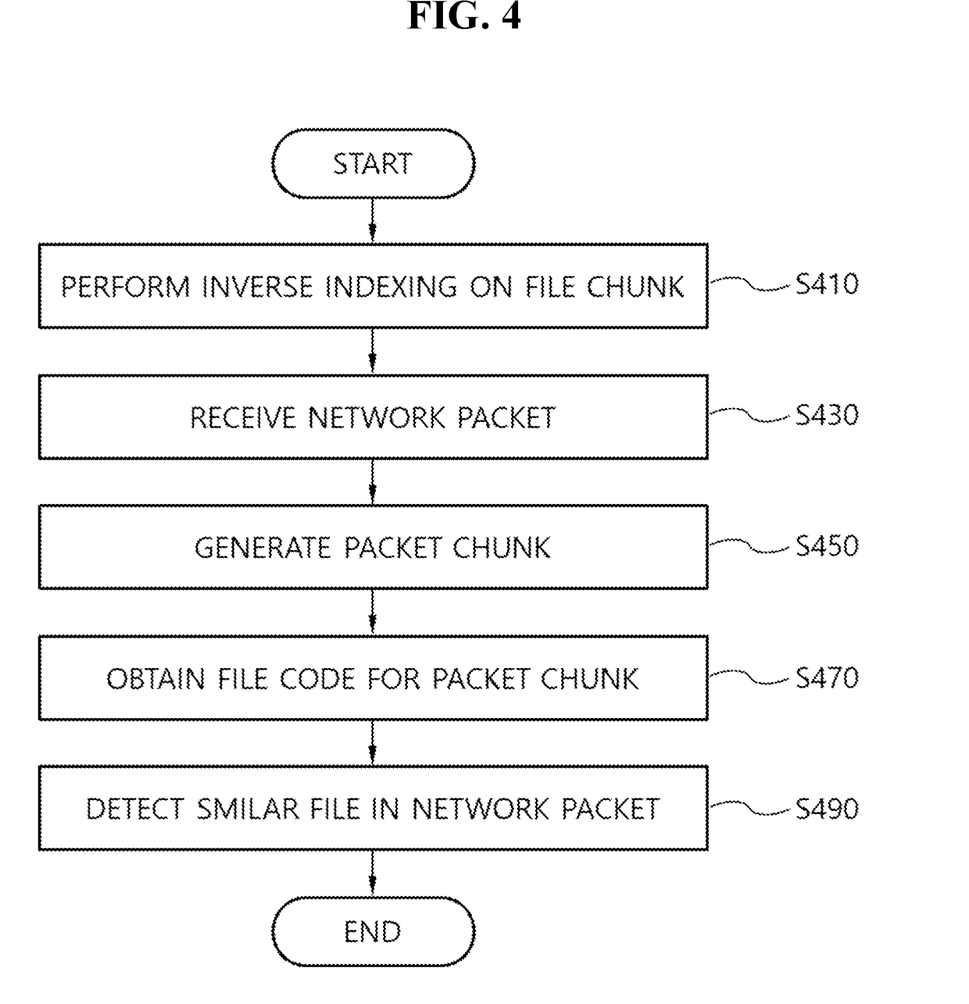
FIG. 4 is a flowchart illustrating a process of detecting a target file based on network packet analysis according to the present disclosure.

FIG. 4 is a flowchart illustrating a process of detecting a target file based on network packet analysis according to the present disclosure.

Referring to FIG. 4, the apparatus 130 for detecting a target file may generate at least one file chunk by performing a chunk operation on a detection target file through the inverse indexing database unit 310 and may inversely index each of the at least one file chunk as a detection target file code in operation 5410. The apparatus 130 may receive a network packet through the network packet receiving unit 320 in operation 5430. The apparatus 130 may generate at least one packet chunk by performing a chunking operation on the network packet through the packet chunk processing unit 330 in operation 5450.

In addition, the apparatus 130 may generate a packet chunk query word for each of at least one packet chunk through the chunk query unit 340 and provide the packet chunk query word to the inverse indexing database unit 310 to receive a detection target file code in operation 5470. The apparatus 130 may determine a most likely detection target file code in the network packet based on the detection target file code received through the file code determining unit 350 in operation 5490.

Figure 5:
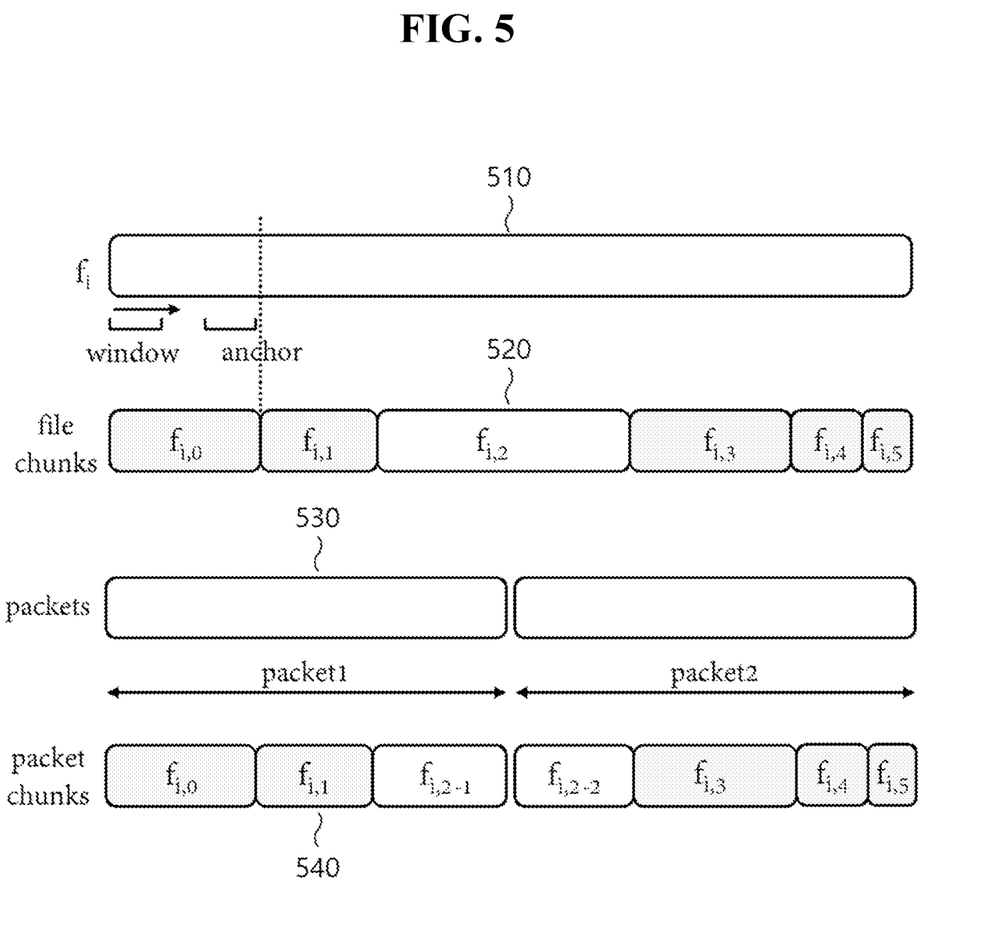
FIG. 5 is a diagram illustrating a dynamic chunking operation for detecting a target file according to the present disclosure.

FIG. 5 is a diagram illustrating a dynamic chunking operation for detecting a target file according to the present disclosure.

Referring to FIG. 5, the apparatus 130 for detecting a target file may acquire file chunks 520 related to a detection target file 510 and construct an inverse index database (DB) based on the obtained file chunks 520. In addition, the apparatus 130 may obtain packet chunks 540 for the network packet 530 in order to detect a target file based on the inverse index database (DB). The apparatus 130 may use various chunking algorithms for chunking operation, and in particular, may use an AE chunking algorithm corresponding to a content-defined-chunking algorithm as a dynamic chunking algorithm.

The AE chunking algorithm may be performed through the following steps.

Step 1) Inputting of data stream

A data stream where the first byte is B is input.

Step 2) Searching for extremum

An extremum M that satisfies the following condition is searched.

Condition 1: An interval [B, N] is empty or the value of M is greater than the value of all bytes in the interval [B, N].

Condition 2: The value of M is not less than the value of all bytes in an interval [D, C].

Step 3) Determining of chunk boundary

C is determined as a chunk boundary point. In this case, when a chunk is divided using C as the boundary point, the first byte of the remaining input stream is B'. In this case, N, M, and D are consecutive points, and C and B' are also consecutive points.

In FIG. 5, when a dynamic chunking operation is performed on a file fi, six file chunks 520 may be generated in total. That is, the file chunks 520 may correspond to $f_{i,0}$, $f_{i,1}$, . . . , and $f_{i,5}$, respectively. In addition, when a dynamic chunking operation is performed on network packets (packet1 and packet2), three packet chunks ($f_{i,0}$), ($f_{i,1}$), and ($f_{i,\text{ and 2-1}}$) may be generated for packet 1 and four packet chunks ($f_{i,2-2}$), ($f_{i,3}$), ($f_{i,4}$), and ($f_{i,5}$) may be generated for packet 2. That is, the size and number of chunks generated for each file or for each packet may vary depending on dynamic chunking.

Figure 6:
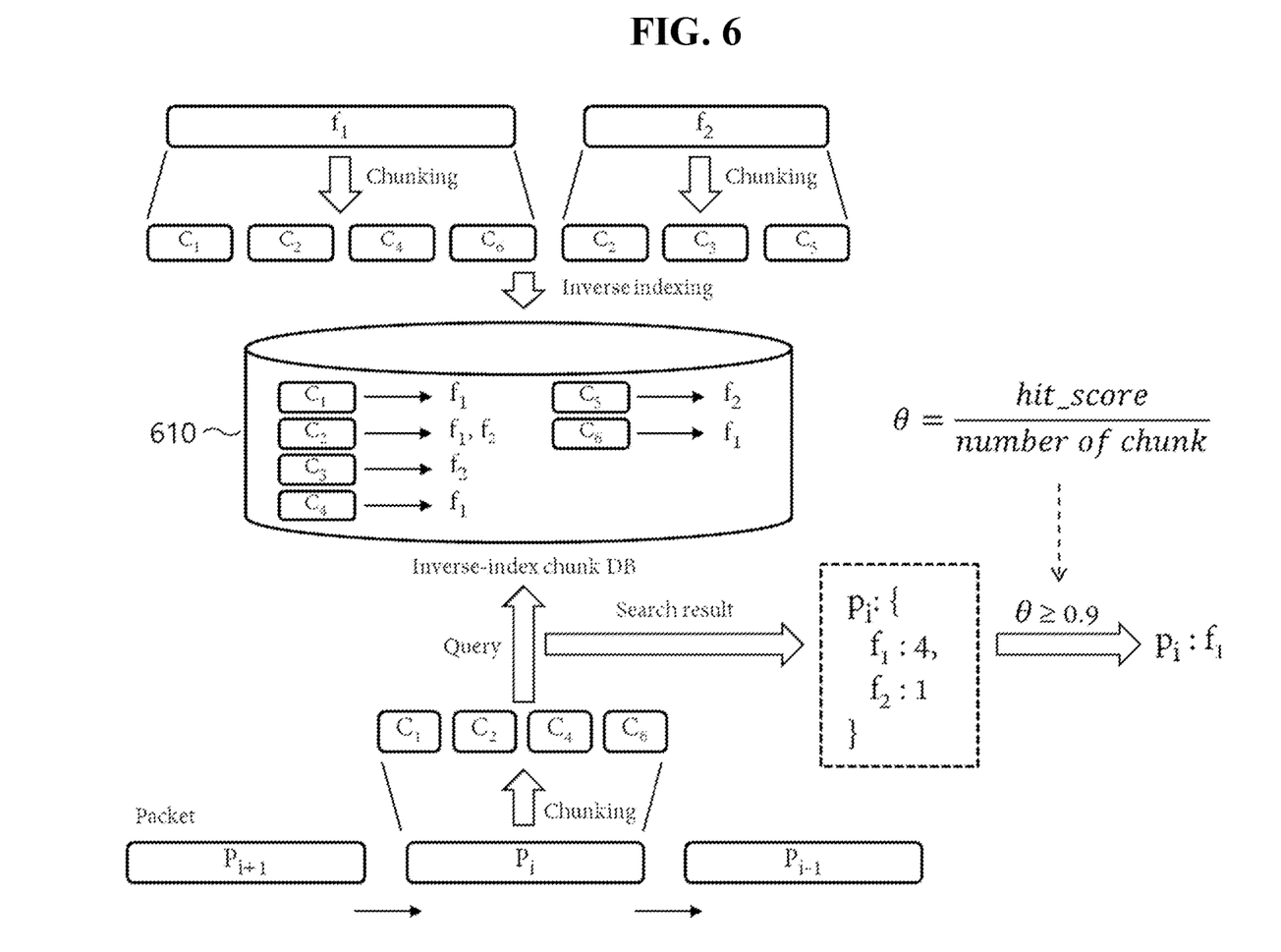
FIG. 6 is a diagram illustrating a process of detecting a target file based on network packet analysis according to the present disclosure.

FIG. 6 is a diagram illustrating a process of detecting a target file based on network packet analysis according to the present disclosure.

Referring to FIG. 6, the apparatus 130 for detecting a target file may construct an inverse index chunk DB 610 for search target files which are preset in order to search for a similar file for a network packet. In this case, the inverse index chunk DB 610 may correspond to an inverse index database (DB) that is constructed by matching index information on files respectively corresponding to file chunks extracted from the search target files. That is, the apparatus 130 for detecting a target file may effectively detect a file most similar to a data packet transmitted through the network based on the inverse index chunk database (DB) 610.

More specifically, the apparatus 130 may obtain packet chunks using a chunking operation that is used in an inversely indexing process for each data packet. The apparatus 130 may obtain file information corresponding to the packet chunks from the inverse index chunk database (DB) 610. In this case, the file information may correspond to a detection target file code and may include unique identification information by which each file can be identified.

For example, packet chunks $C_1$, $C_2$, $C_4$, and $C_6$ may be generated through a chunking operation on a data packet pi, and a target file detection code corresponding to each packet chunk may be obtained by querying the inverse index chunk database (DB) about the corresponding packet chunks. Therefore, a search result for the data packet pi may be the same as pi: {f1:4, f2:1}, and since θ=4/4=1≥0.9, and f1 may be determined as a final target file (or similar file) for the data packet pi.

The apparatus 130 for detecting a target file according to the present disclosure may have advantageous effects in effectively detecting a similar file for a data packet based on the inverse index chunk DB 610 and being applicable regardless of whether a collected packet is lost. In addition, since the apparatus 130 for detecting a target file is applicable to raw packets, there is no pre-processing of parsing into a header and a body, etc. can have advantages.

Although the above has been described with reference to the preferred embodiments of the present disclosure, those skilled in the art can variously modify and change the present disclosure within the scope without departing from the spirit and scope of the present disclosure as set forth in the claims below.

DETAILED DESCRIPTION OF MAIN ELEMENTS

100: system for detecting a target file
110: user terminal 130: apparatus for detecting a target file
150: database
210: processor 230: memory
250: user input/output unit 270: network input/output unit
310: inverse indexing database unit 320: network packet receiving unit
330: packet chunk processing unit 340: chunk query unit
350: file code determining unit 360: controller
510: detection target file 520: file chunk
530: network packet 540: packet chunk
610: inverse index chunk DB

What is claimed is:

1. An apparatus for detecting a target file based on network packet analysis, the apparatus comprising:

an inverse indexing database unit configured to generate at least one file chunk by performing a chunking operation on a detection target file, and inversely index each of the at least one file chunk as a detection target file code;

a network packet receiving unit configured to receive a network packet;

a packet chunk processing unit configured to generate at least one packet chunk by performing a chunking operation on a network packet;

a chunk query unit configured to generate a packet chunk query word for each of the at least one packet chunk and provide the packet chunk query word to the inverse indexing database unit to receive the detection target file code; and a file code determining unit configured to determine an identified detection target file code in the network packet based on the received detection target file code, wherein the network packet receiving unit is further configured to receive a series of continuously received network packets, wherein the packet chunk processing unit is further configured to, based on an error in a specific network packet among the series of the network packets being equal to or greater than a predetermined criterion, assume a detection target file code of the specific network packet based on an adjacent detection target file code of an adjacent network packet of the specific network packet and to not perform the chunking operation on the specific network packet, and wherein the inverse indexing database unit, the network packet receiving unit, the packet chunk processing unit, the chunk query unit, and the file code determining unit are each implemented via at least one processor.

2. The apparatus of claim 1, wherein the inverse indexing database unit is further configured to perform asymmetric extremum chunking (AE chunking) on the detection target file.

3. The apparatus of claim 2, wherein the inverse indexing database unit is further configured to chunk a character string based on an extremum detected in a local range of the detection target file and a specified window size.

4. The apparatus of claim 3, wherein the inverse indexing database unit is further configured to, when a new extremum is not detected in the specified window size, generate a corresponding file chunk.

5. The apparatus of claim 4, wherein the inverse indexing database unit is further configured to, when a new extremum is detected in the window size, defer the generating of the corresponding file chunk.

6. The apparatus of claim 1, wherein the packet chunk processing unit is further configured to, regardless of whether there is an error in the network packet, independently process the series of continuously received network packets.

7. The apparatus of claim 1, wherein the chunk query unit is further configured to generate a packet chunk bitmap for each of the at least one packet chunk and receive the detection target file code based on the packet chunk bitmap.

8. The apparatus of claim 1, wherein the file code determining unit is further configured to determine, as the identified detection target file code, a detection object file code having a highest frequency of occurrence among detection object file codes of each of the at least one packet chunk, based on integrating detection target file codes corresponding to each packet chunk for a specific data packet, and determining a corresponding detection target file code as a similar file corresponding to the specific data packet.

9. The apparatus of claim 8, wherein the file code determining unit is further configured to, when the detection target file code having the highest frequency of occurrence constitutes a majority among detection target file codes of each of the at least one packet chunk, determine the identified detection target file code.

10. The apparatus of claim 8, wherein the file code determining unit is further configured to, when the detection target file code having the highest frequency of occurrence does not constitute a majority among detection target file codes of each of the at least one packet chunk, determining the identified detection target file code by considering adjacent network packets together.

11. The apparatus of claim 1, wherein the inverse indexing database unit is further configured to generate a chunk bitmap for each of the at least one file chunk and store the chunk bitmap in association with the detection target file code, wherein the chunk bitmap is unique identification information corresponding to the each of the at least one file chunk to form a bitmap index, and wherein each of the at least one file chunk is connected to the detection target file code through the bitmap index.

12. A method for detecting a target file based on network packet analysis, the method comprising:

generating at least one file chunk by performing a chunking operation on a detection target file, and inversely indexing each of the at least one file chunk as a detection target file code;

receiving a network packet;

generating at least one packet chunk by performing a chunking operation on the network packet;

generating a packet chunk query word for each of the at least one packet chunk and providing the packet chunk query word to receive the detection target file code;

determining an identified detection target file code in the network packet based on the received detection target file code;

receiving a series of continuously received network packets; and based on an error in a specific network packet among the series of the network packets being equal to or greater than a predetermined criterion, assuming a detection target file code of the specific network packet based on an adjacent detection target file code of an adjacent network packet of the specific network packet and not performing the chunking operation on the specific network packet.

13. The method of claim 12, wherein the inversely indexing comprises generating a chunk bitmap for each of the at least one file chunk and storing the chunk bitmap in association with the detection target file code.

14. The method of claim 13, wherein the receiving of the detection target file code comprises generating a packet chunk bitmap for each of the at least one packet chunk and receiving the detection target file code based on the packet chunk bitmap.

15. A non-transitory computer-readable medium having embodied thereon a program, which when executed by a computer causes the computer to execute a method, the method comprising:

generating at least one file chunk by performing a chunking operation on a detection target file, and inversely indexing each of the at least one file chunk as a detection target file code;

receiving a network packet;

generating at least one packet chunk by performing a chunking operation on the network packet;

generating a packet chunk query word for each of the at least one packet chunk and providing the packet chunk query word to the inverse indexing database unit to receive the detection target file code;

determining an identified detection target file code in the network packet based on the received detection target file code;

receiving a series of continuously received network packets; and based on an error in a specific network packet among the series of the network packets being equal to or greater than a predetermined criterion, assuming a detection target file code of the specific network packet based on an adjacent detection target file code of an adjacent network packet of the specific network packet and determining to not perform performing the chunking operation on the specific network packet.

* * * * *